July 18, 1939. A. R. COE 2,166,130
REMOVABLE LOCKING DEVICE
Filed Dec. 2, 1937
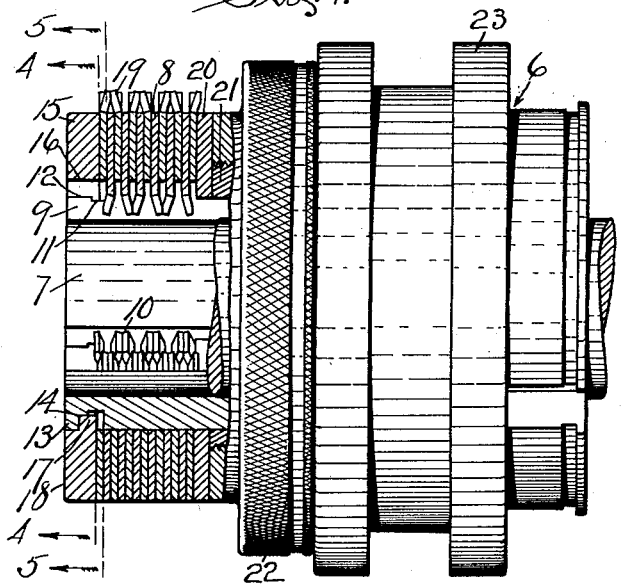
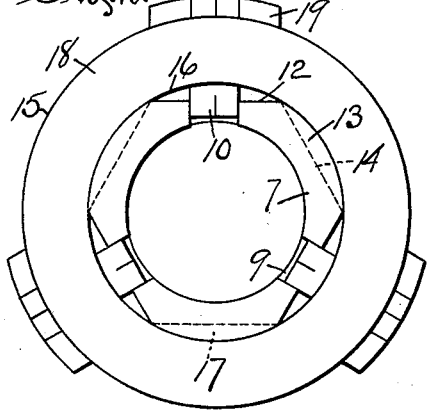
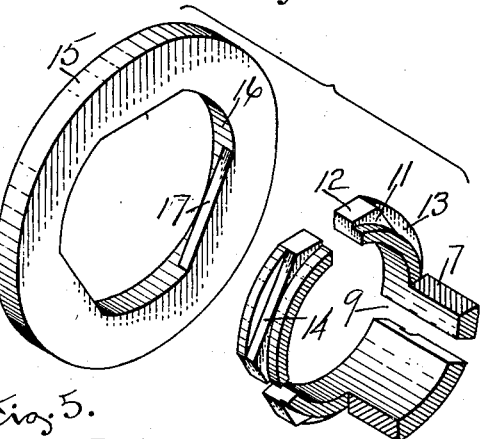
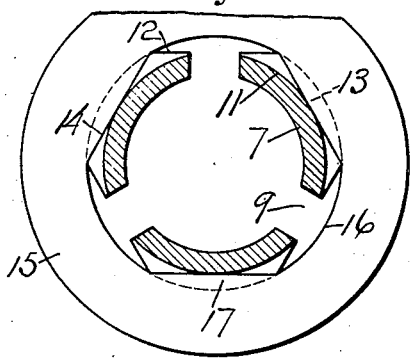
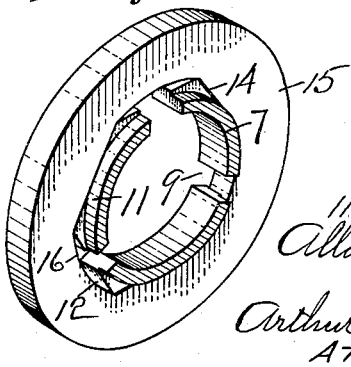
INVENTOR
Allan R. Coe
by
Arthur B. Jenkins
ATTORNEY Patented July 18, 1939

2,166,130

UNITED STATES PATENT OFFICE 2,166,130

REMOVABLE LOCKING DEVICE

Allan R. Coe, Manchester, Conn., assignor to The Carlyle Johnson Machine Co., Manchester, Conn., a corporation of Ohio Application December 2, 1937, Serial No. 177,804

6 Claims. (Cl. 287—53)

My invention relates to a class of devices that may be readily placed in locking position to retain parts in place and that may be as readily removed for the release of such parts, and an object of my invention, among others, is the production of a locking device of this character that shall be particularly efficient for the purpose for which it is designed and that may be readily secured in place and also as readily removed without the use of tools.

One form of my improved locking device, in the construction and use of which the objects herein set out, as well as others, may be attained is illustrated in the accompanying drawing in which—

Figure 1 is a side view of a friction clutch equipped with my improved locking device, the clutch beng partially broken away to show construction.

Figure 2 is an end view of the same.

Figure 3 is an isometric perspective view showing the locking device and its supporting member in position for attachment of the former to the latter, which is cut away to show construction.

Figure 4 is a view in cross section on a plane denoted by the dotted lines 4—4 of Fig. 1.

Figure 5 is an isometric perspective view on a plane denoted by the dotted lines 5—5 of Figure 1 but with the clutch disks removed.

While my improved locking device is not limited in its use to any particular type of mechanism nor for retaining any particular parts, yet, as I have found it especially useful for retaining the clutch disks of a friction clutch in place on the clutch body I have selected such a mechanism for the purpose of disclosure of my invention herein. In the drawing accompanying this description the numeral 6 denotes generally a friction clutch which may be of any desired construction and therefore does not require a detailed description herein for a full understanding of my invention, other than to state that this clutch includes a clutch body 7 one end of which is shown in section in Fig. 1. Clutch disks 8 are assembled upon the body at this end thereof, and these disks may be of any well-known construction common to friction disks employed in friction disk clutches although a special construction is shown herein but not claimed as they are no part of the invention of this application. In the structure herein shown this end of the clutch body has slots 9 extending inwardly for some distance to receive projections 10 from the inner edges of some of the clutch disks 8 and as shown in Fig. 2. The end of the body has a flange creating an annular groove 11. This flange is of generally circular shape, but the circular shape is broken by flats 12 equally spaced apart, three of these flats being shown herein. Retaining lips 13 are located between the flats, these lips constituting the circular portion of the flange. Locking shoulders 14 are located behind the lips 13, these locking shoulders corresponding in length to that of the flats 12, the slots 9 extending through said flats.

A locking ring 15 is constructed to fit over the supporting end of the body just described, this ring being preferably of circular shape and having a circularly shaped opening 16.

Locking lips 17 extend inwardly from the edge of the central opening 16 and at a slight distance from the front surface 18 of the ring. These locking lips are of a length corresponding with the flats 12 and also with the locking shoulders 14 and are of a thickness substantially that of said locking shoulders.

The projections 10 and ears 19 on the friction disks are formed to provide spring action exerting a tendency to separate the disks, the projections 10 on every other disk touching each other across the edges of the intermediate disks, and the ears 19 on alternate disks also touching each other across the outer edges of the intermediate disks, these projections and ears being forced backwardly when the disks are pressed together for clutching operation, as shown in Fig. 1.

In the operation of the device thus far disclosed the ring 15 is placed upon the supporting or outer end of the body with the edges of the locking lips 17 in position to pass over the flats 12. The ring being now pressed inwardly on the body, which comprises a support, the lips 17 are located opposite the annular groove 11, the spring elements of the disks being compressed in this operation. Said ring may now be turned to locate the lips 17 opposite the shoulders 14 in position to pass on to them, which they will do, by the spring action of the friction disks when pressure upon the ring is released.

The clutch also embodies another means for placing and removing the locking ring, in case it is not desired to make use of the spring action of the friction disks. To this end the clutch disks, which are backed up by a pressure plate 20 mounted upon the body next to said disks, and a clutch ring 21, mounted on the body next to said pressure plate, said plate and ring each having projections extending into the slots 9 to retain them from rotation but to permit sliding movement thereof upon the support or clutch body 7, are made use of, in connection with an adjusting ring 22 which is mounted upon and screw threadedly engaged with the clutch ring 21. This adjusting ring 22 is located adjacent an operating sleeve 23 slidably mounted upon the body in a manner common to clutches of this type. This adjusting ring cooperates with other parts within the clutch, and not shown, to regulate the amount of friction to be exerted by the clutch disks, a showing of such parts within the clutch not being necessary for a thorough understanding of the present invention but reference being had to my copending application filed December 2, 1937, Serial No. 177,804, for a further understanding if desired.

This adjusting ring 22 may be screwed backwardly away from the end of the clutch body or support a distance sufficient to permit the clutch disks, pressure plate, and clutch ring to be moved back far enough to locate the locking lips 17 in the annular groove 11 so that the ring may be turned to pass said lips into said groove. The locking ring 15 now being turned as hereinbefore described, said lips may be located opposite the locking shoulders 14 and the ring may now be pulled outwardly to engage the lips with said shoulders. The adjusting ring 22 now being screwed backwardly to its proper position, the locking ring is securely retained in place.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A locking device including a support having a groove near its end, a locking shoulder formed in the wall of said groove, creating a retaining lip bounding said shoulder, a locking ring shaped to fit over the end of said support and having a locking lip formed to pass along said groove and engage said shoulder to prevent said ring from turning, and means to retain said locking lip engaged with said shoulder.

2. A locking device including a support having a groove near its end, a plurality of locking shoulders formed in the wall of said groove creating retaining lips bounding said shoulders, a locking ring shaped to fit over the ends of said support and having locking lips shaped to pass along said groove and engage said shoulders to prevent said ring from turning, and means to retain said locking lips engaged with said shoulders.

3. A locking device including a support having an annular groove near its end, locking shoulders formed in the wall of said groove at even intervals apart, the lengths of said shoulders being the same as that of the intervals, a locking ring shaped to fit over the end of said support and having locking lips shaped to pass along said groove to engage said shoulders to prevent said ring from turning, said lips being of the lengths and spaced to correspond with the shoulders in the groove, and means to retain said locking lips engaged with said shoulders.

4. A locking device including a support having an annular groove near its end, said support being of generally round shape, locking shoulders formed in the wall of said groove creating retaining lips bounding said shoulders, flats cutting in to the circular shape of said end and evenly spaced therearound, a locking ring shaped to fit over the end of said support, said locking ring including locking lips formed to pass over said flats and along said groove to engage said shoulders to prevent the ring from turning, and means to retain said locking lips engaged with said shoulders.

5. A locking device including a support having a circularly extending groove, a shoulder extending lengthwise of the groove in one wall thereof, a retaining lip bounding said shoulder and spaced from said groove, a flat on the edge of said support, a locking ring having a locking lip shaped to pass over said flat into said groove to engage said shoulder when turned to position for such purpose, and means to retain said locking lip engaged with said shoulder.

6. A locking device including a support of generally round shape and having an annular groove near its end, locking shoulders formed in the wall of said groove creating retaining lips comprising the circular portion of said end, flats formed between said retaining lips and cutting into the circular portion of said end, a locking ring of generally round shape having a hole of round form in the outer face of said ring, locking lips projecting into said hole at the rear face of said ring, said locking lips being shaped to pass over said flats into said groove and to pass along said groove to points opposite said shoulders when the ring is turned and into engagement with the shoulders when the ring is moved outwardly, and means to retain said locking lips in engagement with said shoulders.

ALLAN R. COE.